VANCE & WATKINS.
Post-Hole Auger.
No. 70,137. Patented Oct. 22, 1867.
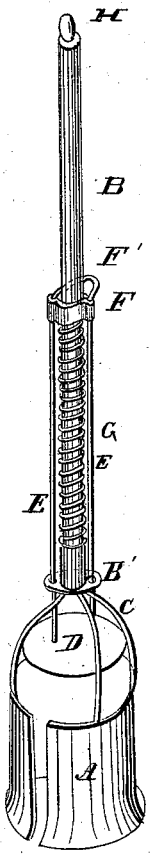

United States Patent Office.

NATHANIEL S. VANCE AND EDWARD WATKINS, OF DECATUR, ILLINOIS.

Letters Patent No. 70,137, dated October 22, 1867.

INSTRUMENT FOR CUTTING POST-HOLES.

The Schedule referred to in these Letters Patent and making part of the same.

TO ALL WHOM IT MAY CONCERN:

Be it known that we, NATHANIEL S. VANCE and EDWARD WATKINS, of Decatur, in the county of Macon, and State of Illinois, have invented a new and useful Improvement in Augers for Boring Post-Holes; and we do hereby declare that the following is a full, clear, and exact description of the same, reference being had to the annexed drawings, making part of this specification, in which it is shown in perspective.

A is a cylindrical tube. The lower edge is sharpened and turned outwardly, so that on being forced into the earth the dirt shall be compressed in the tube to an extent sufficient to enable the auger to be raised and carry with it the earth enclosed in the tube. It has also a vertical opening to permit the free escape of the air and avoid its return. This tube is connected with the handle B by the rods C. D is a plunger hung to rods E which pass through openings in a flange, B', on the bottom of the handle, and are attached to a collar, F, surrounding and freely sliding on the handle. This plunger is smaller in diameter than the tube, and is intended to be used for the purpose of expelling the earth raised by the tube A therefrom. A projection, F', attached to the collar F, is intended to receive the foot or band used in depressing the plunger. The plunger is raised and held up by a spiral spring, G, surrounding the handle, and bearing against the flange B' and collar F. A steel shovel, H, is attached to the upper end of the handle B, to be used in cutting roots and removing stones or other obstructions in the ground.

What we claim as our invention, and desire to secure by Letters Patent, is—

An instrument for cutting post-holes, formed by a combination of the tubular cutter A, constructed as described, with the handle B, plunger D, rods E, collar F, and spiral spring G, substantially as set forth.

In testimony whereof we have signed our names to this specification in the presence of two subscribing witnesses.

NATHANIEL S. VANCE,
EDWARD WATKINS.

Witnesses:
EDWARD BRAMBLE,
JOHN S. VANCE.